United States Patent Office 2,734,440
Patented Feb. 14, 1956

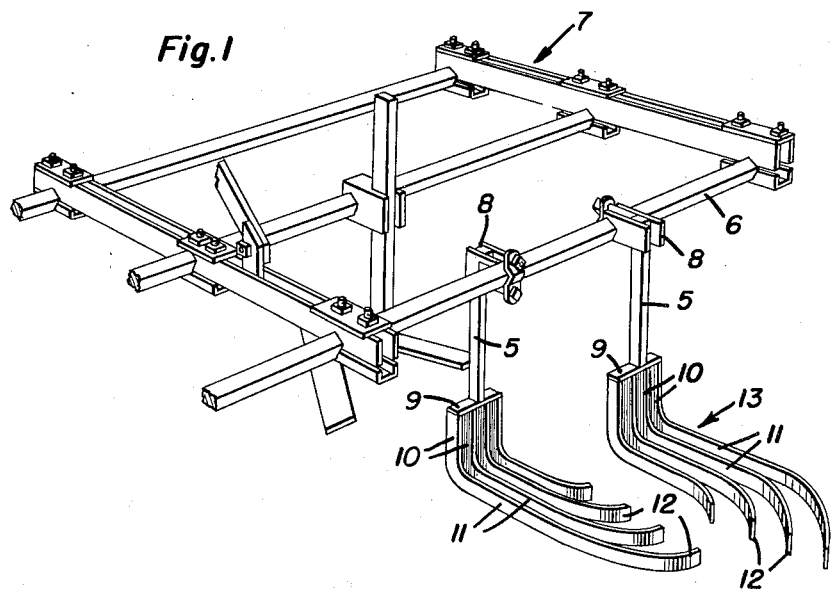
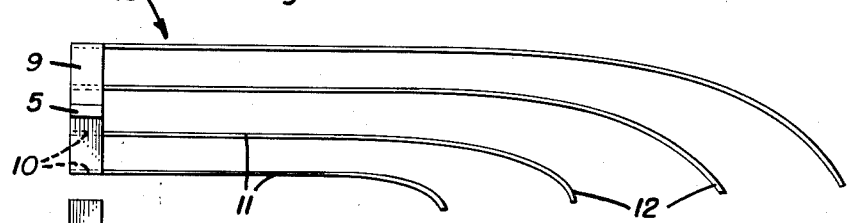
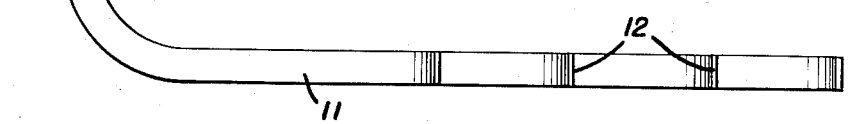
Loyd C. Davis
INVENTOR.

2,734,440

CULTIVATOR TOOL

Loyd C. Davis, Grandview, Wash.

Application December 10, 1951, Serial No. 260,898

1 Claim. (Cl. 97—168)

The present invention relates to new and useful improvements in cultivator tools and has as its primary object to provide, in a manner as hereinafter set forth, novel means for effectively pulverizing the soil in addition to covering small weeds by crowding the dirt all around the plants, the device being particularly intended for use in row crops.

Another very important object of the invention is to provide a tool of the character described which may be expeditiously mounted for operation on a conventional cultivator.

Other objects of the invention are to provide a cultivator tool of the character set forth which will be comparatively simple in construction, strong, durable, compact and which may be manufactured at low cost.

All of the foregoing and still further objects and advantages of the invention will become apparent from a study of the following specification, taken in connection with the accompanying drawing wherein like characters of references designate corresponding parts throughout the several views, and wherein:

Figure 1 is a perspective view, showing the invention mounted for operation on a cultivator;

Figure 2 is a top plan view of the device; and

Figure 3 is a side elevational view.

Referring now to the drawing in detail, it will be seen that the embodiment of the invention which has been illustrated comprises a pair of vertical metallic shanks which are detachably mounted on the usual rear tool bar 6 of a conventional cultivator 7, forwardly and rearwardly of said tool bar, through the medium of suitable clamps 8. The clamps 8 permit lateral adjustment of the shanks 5 on the tool bar 6. On the lower ends the shanks 5 are provided with transversely extending T-heads 9.

Fixed on the T-heads 9 of the shanks 5 is a plurality of spaced, face opposed downwardly and rearwardly extending blades 10 of increasing length outwardly. The rearwardly directed portions 11 of the blades 10 terminate in inwardly curved free end portions 12.

It is thought that the operation of the invention will be readily apparent from a consideration of the foregoing. Briefly, as the cultivator 7 moves forwardly over the ground, the tools or units 13 constituting the present invention straddle the row. The vertical and rearwardly extending portions of the spaced blades 10 pulverize the soil. Then, this soil is directed inwardly and crowded around the plants by the curved rear end portions 12 of the blades 10 covering small weeds, etc. The clamps 8 permit the tools 13 to be adjusted as desired on the bar 6 of the cultivator 7. Of course, the tool may comprise any desired number of the blades 10. Also, the blades 10 may be sharpened, if desired.

It is believed that the many advantages of the cultivator tool constructed in accordance with the present invention will be readily understood and although a preferred embodiment of the device is as illustrated and described, it is to be understood that changes and the details of construction may be resorted to which will fall within the scope of the invention as claimed.

Having described the invention, what is claimed as new is:

The combination with a row crop cultivator including a transverse tool bar, of a pair of vertical, depending shanks mounted on said tool bar, one forwardly and the other rearwardly thereof, clamping means for mounting and adjusting the lateral positions of said shanks on said bar relative to a crop row, said shanks being spaced from each other for the passage of a row of plants therebetween, transverse T-heads on the lower ends of said shanks, and a plurality of flat, parallel blades fixed on said T-heads and extending downwardly and then rearwardly therefrom in spaced, face opposing relation for pulverizing the soil and channeling said soil therebetween, said blades being of increasing length outwardly and including inwardly curved free end portions terminating at spaced longitudinal points along two rearwardly diverging lines in a horizontal plane for the passage of the plants therebetween and for directing the soil inwardly around said plants from opposite sides of the row.

References Cited in the file of this patent

UNITED STATES PATENTS

| 648,828 | Baker | May 1, 1900 |
| 988,865 | Dixon | Apr. 4, 1911 |
| 2,597,821 | Rowan | May 20, 1952 |

FOREIGN PATENTS

| 385,942 | France | Apr. 2, 1908 |
| 4,407 | Great Britain | Sept. 14, 1883 |